United States Patent
Hossain et al.

(10) Patent No.: US 7,656,852 B2
(45) Date of Patent: Feb. 2, 2010

(54) METHOD AND APPARATUS OF SELECTIVELY TYING THE OPENING AND CLOSING OF EVDO AND PPP SESSIONS

(75) Inventors: Asif Hossain, Kanata (CA); Shailesh Kaul, Ottawa (CA); Muhammad Khaledul Islam, Ottawa (CA); Suresh Periyalwar, Ottawa (CA); Grace Yeung, Nepean (CA); Shahid Chaudry, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/334,457

(22) Filed: Dec. 13, 2008

(65) Prior Publication Data

US 2009/0103505 A1     Apr. 23, 2009

Related U.S. Application Data

(63) Continuation of application No. 11/271,517, filed on Nov. 10, 2005, now Pat. No. 7,492,746.

(60) Provisional application No. 60/732,489, filed on Nov. 2, 2005.

(51) Int. Cl.
*G06F 15/16* (2006.01)
(52) U.S. Cl. ...................................... 370/338; 370/328
(58) Field of Classification Search .................. 370/328, 370/329, 338, 437, 465, 332, 342, 352
See application file for complete search history.

(56) References Cited

U.S. PATENT DOCUMENTS

2007/0058578 A1* 3/2007 Hossain et al. .............. 370/328

* cited by examiner

*Primary Examiner*—Sam Bhattacharya (57) ABSTRACT

Method, and associated apparatus, for operating a hybrid access terminal operable in a CDMA 1x/EVDO hybrid communication session system. The hybrid access terminal is operable to communicate pursuant to an EVDO communication session and to a PPP communication session. The opening and closing of the communication sessions are independent of one another. Opening of one session does not require opening of another of the sessions. And, closing of one of the sessions does not require closing of the other of the sessions.

20 Claims, 7 Drawing Sheets

METHOD AND APPARATUS OF SELECTIVELY TYING THE OPENING AND CLOSING OF EVDO AND PPP SESSIONS

CROSS-REFERENCE TO RELATED APPLICATION

This application is a continuation application of patent application Ser. No. 11/271,517 filed on Nov. 10, 2005, which claims the benefit of priority to U.S. Provisional Application No. 60/732,489 filed on Nov. 2, 2005, the contents of all of which are incorporated herein by reference.

FIELD OF THE APPLICATION

The present application relates to mobile data devices and in particular to the establishment and taking down of EVDO and PPP sessions between the mobile data device and the network.

BACKGROUND

A CDMA 1X/EVDO hybrid access terminal (mobile device) is a hybrid system that has evolved from the CDMA 2000 system. EVDO stands for Evolution Data Only or Data Optimized and, as suggested by this, is a data only system. EVDO is also alternatively known as High Rate Packet Data (HRPD). One advantage of EVDO systems is that they allow a higher transfer rate for data. They are also useful to carriers to clear the 1X system voice capacity by removing data traffic from the 1X system.

Once a hybrid access terminal has an EVDO session established, applications that use the EVDO air interface will need to open a point-to-point protocol (PPP) session using Simple IP or Mobile IP. Current systems have two options for tying the PPP session with the EVDO session. By default, the two are never tied. Alternatively, the two may be always tied together.

The problem with this is that if EVDO and PPP sessions are always tied together, situations exist where the EVDO session does not necessarily need to be closed when the PPP session is closed, or the PPP session does not necessarily need to be closed when the EVDO session is closed. If the two are not tied together, there are situations where it is desirable to close both the EVDO session and the PPP session together and this may not happen if the two are not tied together.

BRIEF DESCRIPTION OF THE DRAWINGS

The present application will be better understood with reference to the drawings in which.

DETAILED DESCRIPTION

The present method and apparatus overcome the deficiencies of the prior art by providing for the selective tying of an EVDO session opening or closing with a PPP session opening or closing.

In hybrid access terminals that are always on devices, in other words, continuously have a data session active, the present method and apparatus provide that when an EVDO session is opened, the PPP session should also be opened if it is not already open. Whenever either of the EVDO session or the PPP session is closed, the other does not have to be closed unless the hybrid access terminal radio has been turned off. As will be appreciated by those skilled in the art, if the mobile device radio has been turned off then it is desirable to close both the EVDO and the PPP session in order to ensure that network resources are not unnecessarily used.

In the case of non always on devices, when the mobile device is powered on, the EVDO session does not have to be opened unless an application that uses packet data services is running. Once an application that uses packet data services is started, the EVDO network needs to be accessed and the EVDO and the PPP sessions are started. For non always on devices, once the application is done with the data call, both the PPP and the EVDO sessions can be terminated to save network resources.

The present application therefore provides a method for selectively tying an Evolution Data Only (EVDO) session and a point to point protocol (PPP) session in an always-on hybrid access terminal comprising the steps of: when a radio on the hybrid access terminal is turned off, closing both the EVDO session and the PPP session; and when the radio remains on and one of the EVDO session and PPP session are closed, leaving the other of the EVDO session and PPP session open.

The present application further provides a method for selectively tying an Evolution Data Only (EVDO) session and a point to point protocol (PPP) session in an always-on hybrid access terminal comprising the steps of: checking whether one of the EVDO session and the PPP session are open; if one of the EVDO session and PPP session are open, opening the other of the EVDO Session and PPP session; and if neither of the EVDO session and PPP session are open, opening both the EVDO session and the PPP session.

The present application still further provides an always-on hybrid access terminal adapted for selectively tying an Evolution Data Only (EVDO) session and a point to point protocol (PPP) session, the hybrid access terminal having a radio subsystem including a radio adapted to communicate with a network; a radio processor having a digital signal processor and adapted to interact with said radio subsystem; memory; a user interface; a processor adapted to run user applications and interact with the memory, the radio and the user interface and adapted to run applications, the hybrid access terminal characterized by having means for: closing both the EVDO session and the PPP session when the radio on the hybrid access terminal is turned off; and leaving the other of the EVDO session and PPP session open when the radio remains on and one of the EVDO session and PPP session are closed.

Figure 1:
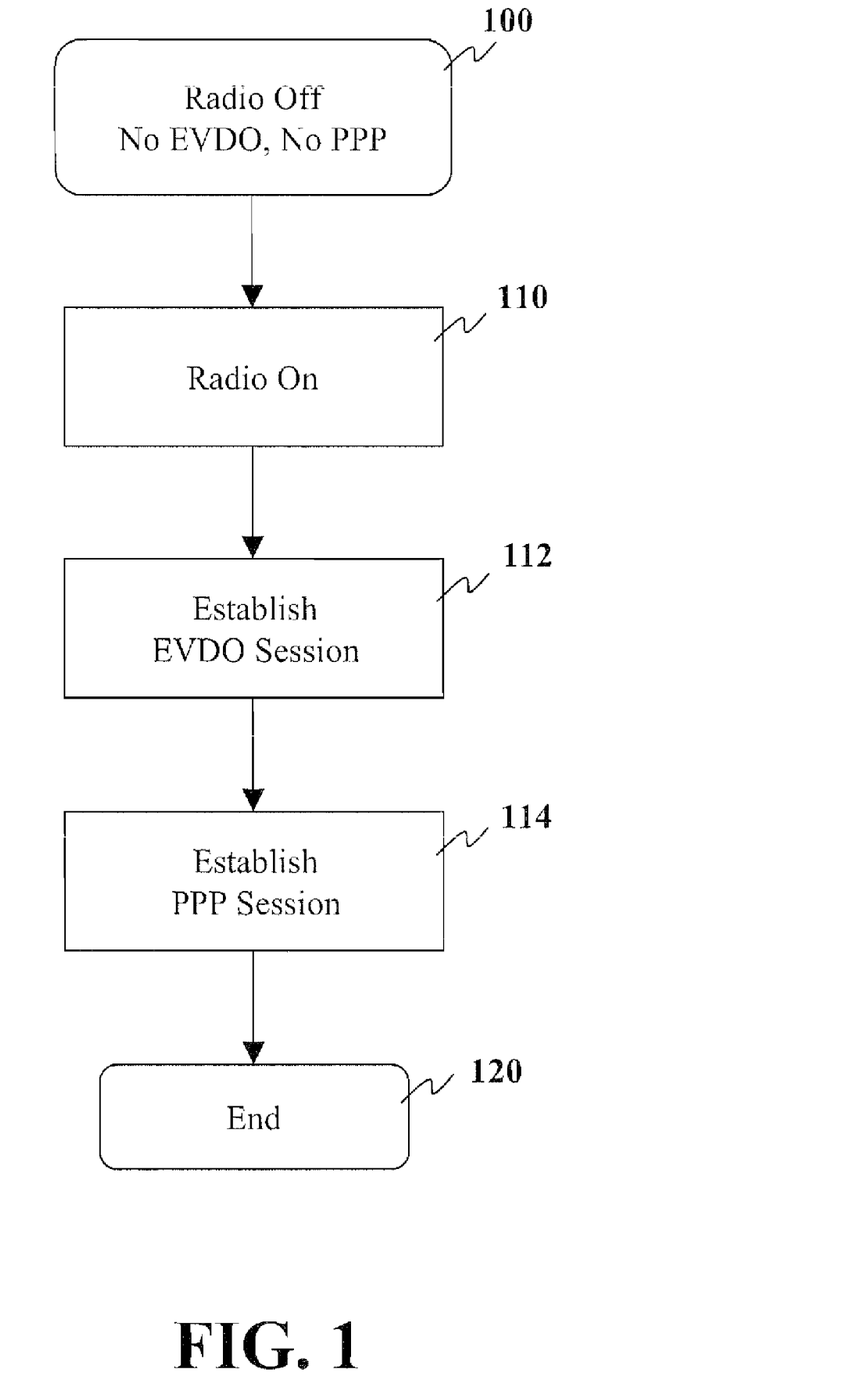
FIG. 1 is flow chart showing the establishment of EVDO and PPP sessions for an always on hybrid access terminal.

Reference is now made to FIG. 1. FIG. 1 illustrates a flow chart for an always on hybrid access terminal in which the initial precondition is that the radio is off, and that there are no PPP or EVDO sessions established in state 100.

The mobile device proceeds to step 110 in which the radio is turned on. Since the device is in an always on hybrid access terminal, it is desirable that a data session be established and therefore the hybrid access terminal proceeds to step 112 in which an EVDO session is established.

Once the EVDO session is established in step 112, the hybrid access terminal proceeds to step 114 in which a PPP session is established. Once both the EVDO and the PPP sessions are established, the hybrid access terminal proceeds to step 120 and ends the process.

Figure 2:
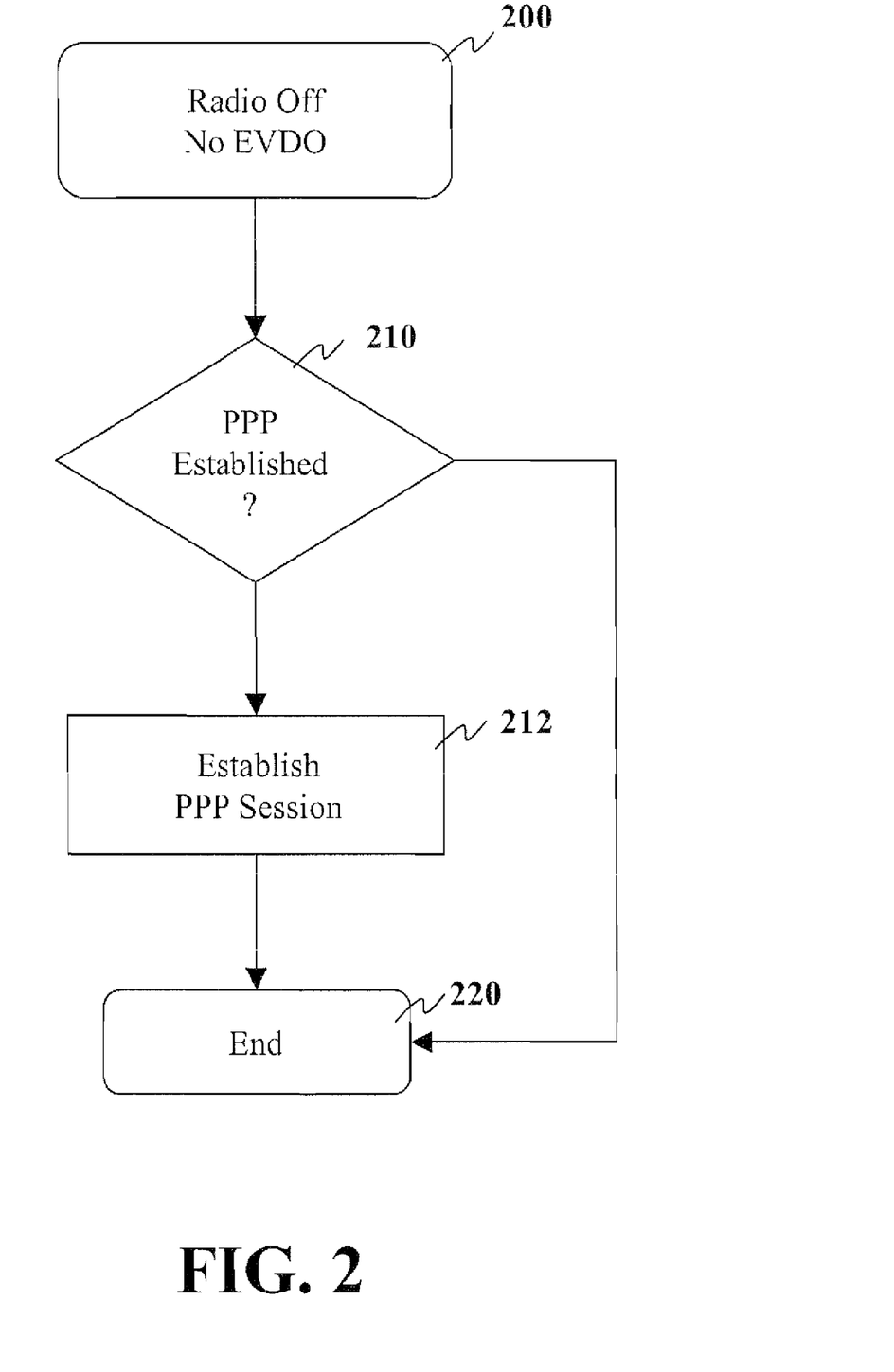
FIG. 2 is a flow chart showing the establishment of a PPP session for an always on hybrid access terminal.

As an alternative to FIG. 1, reference is now made to FIG. 2. FIG. 2 shows an embodiment in which the initial state 200 has the radio on but there is no EVDO session established. This could occur, for example, at a network boundary crossing in which the hybrid access terminal is instructed to close its EVDO session and do a hand-off to a new EVDO network. In this case, it may not be desirable to have a PPP session dropped since this will require negotiation with the new EVDO system to establish a new PPP session, thus requiring more traffic on the network and a higher battery usage on the hybrid access terminal. It is therefore desirable for an always on mobile device when crossing network boundaries and in other situations in which the EVDO session is dropped but the hybrid access terminal remains on to keep the PPP session open.

Referring to FIG. 2, the hybrid access terminal proceeds first to step 210 in which it checks to see whether a PPP session is established. As will be appreciated, if the PPP session is established the hybrid access terminal does not need to do anything else and will proceed to step 220 in which the process is ended.

Conversely, if there is no PPP session established as determined in step 210, the hybrid access terminal proceeds to step 212 in which it establishes a PPP session before proceeding to step 220 in which the process is ended.

Figure 3:
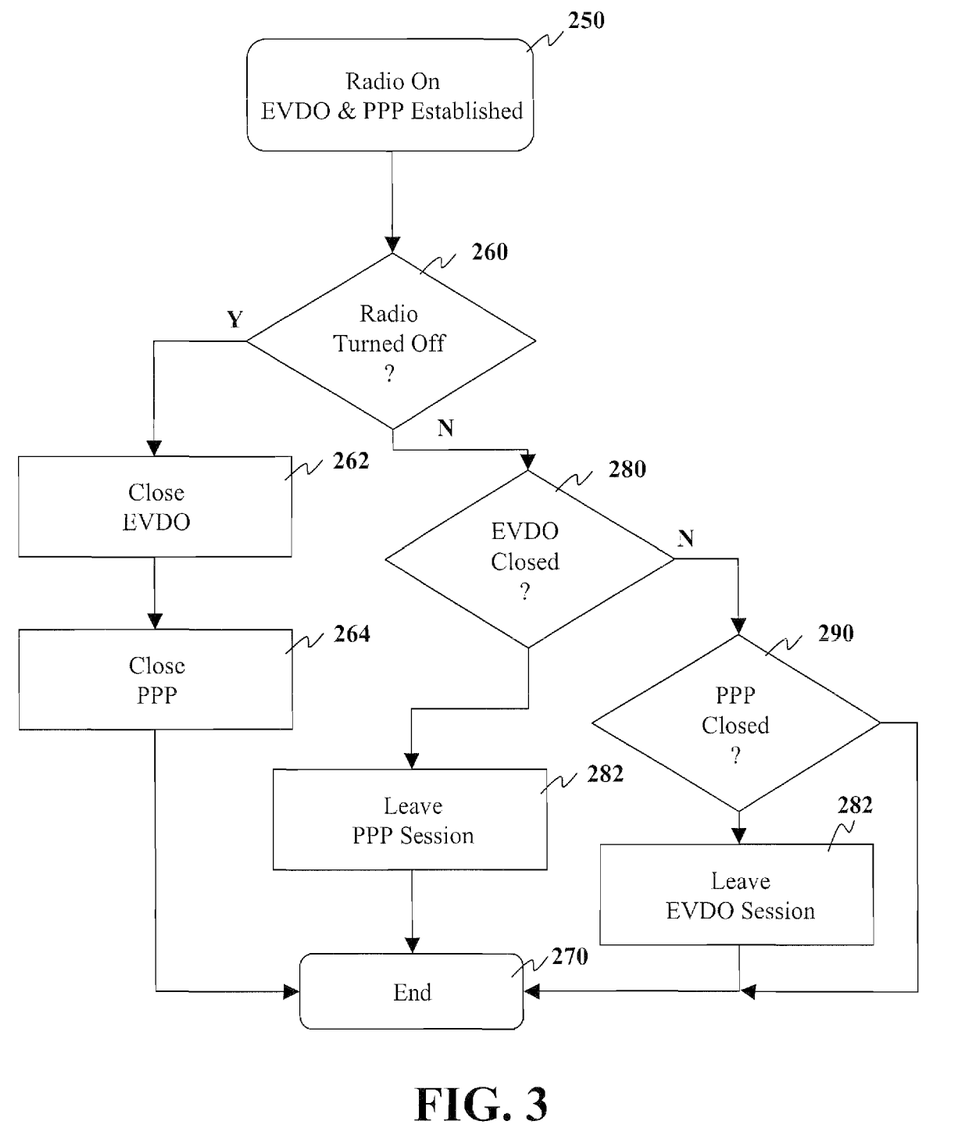
FIG. 3 is a flow chart showing the closing of an EVDO and/or a PPP session for an always on hybrid access terminal.

Referring to FIG. 3, FIG. 3 illustrates a flow chart for an always on hybrid access terminal in which the radio is on, an EVDO session is established and a PPP session is established as illustrated in state 250.

The hybrid access terminal first proceeds to step 260 in which it checks to see whether the radio has been turned off. If the radio has been turned off, the hybrid access terminal should drop its EVDO and its PPP sessions prior to the actual radio being turned off in order to save network resources and to indicate to the hybrid access terminal that it no longer has an EVDO or a PPP session. Thus, from step 262 the hybrid access terminal proceeds to step 262 in which the EVDO session is closed and next to step 264 in which the PPP session is closed. The hybrid access terminal then proceeds to step 270 in which the process is ended.

Conversely, if the radio is not being turned off in step 260, the hybrid access terminal proceeds to step 280 in which checks to see whether the EVDO session has closed. If the EVDO session has closed, the default behaviour should be to leave the PPP session active and thus in step 282 the hybrid access terminal leaves the PPP session active before ending the process in step 270.

If in step 280 it is determined that the EVDO session has not closed, the hybrid access terminal proceeds to step 290 in which it checks whether the PPP session has closed. Again, the default behaviour of the PPP session closes is to leave the EVDO session open and this is done in step 292. The hybrid access terminal then proceeds to step 270 and ends.

Conversely, from step 290 if the PPP session has not closed, then the hybrid access terminal can again proceed to step 270 and end the process.

As will be appreciated by those skilled in the art, instead of ending the process at step 270, the hybrid access terminal could instead continue to loop back to step 260 in which the check for the radio being turned off is performed.

The above therefore provides the advantage that, by not tying the EVDO session and the PPP session together when the radio is not turned off, network traffic is reduced and battery consumption on the device is also reduced. Specifically, since the hybrid access terminal will not tear down the EVDO session if the PPP session is brought down by either the device or the network, unnecessary traffic is avoided in order to re-establish the EVDO session subsequently.

Similarly, if the EVDO session is ended because of the hand-off between a radio network controller (RNC) for one EVDO session and the second EVDO session, the PPP session is not brought down and thus network traffic is reduced and battery consumption on the hybrid access terminal is also reduced. The above would be equally applicable to situations in which the EVDO session is brought down for other reasons besides boundary area transitions.

Figure 4:
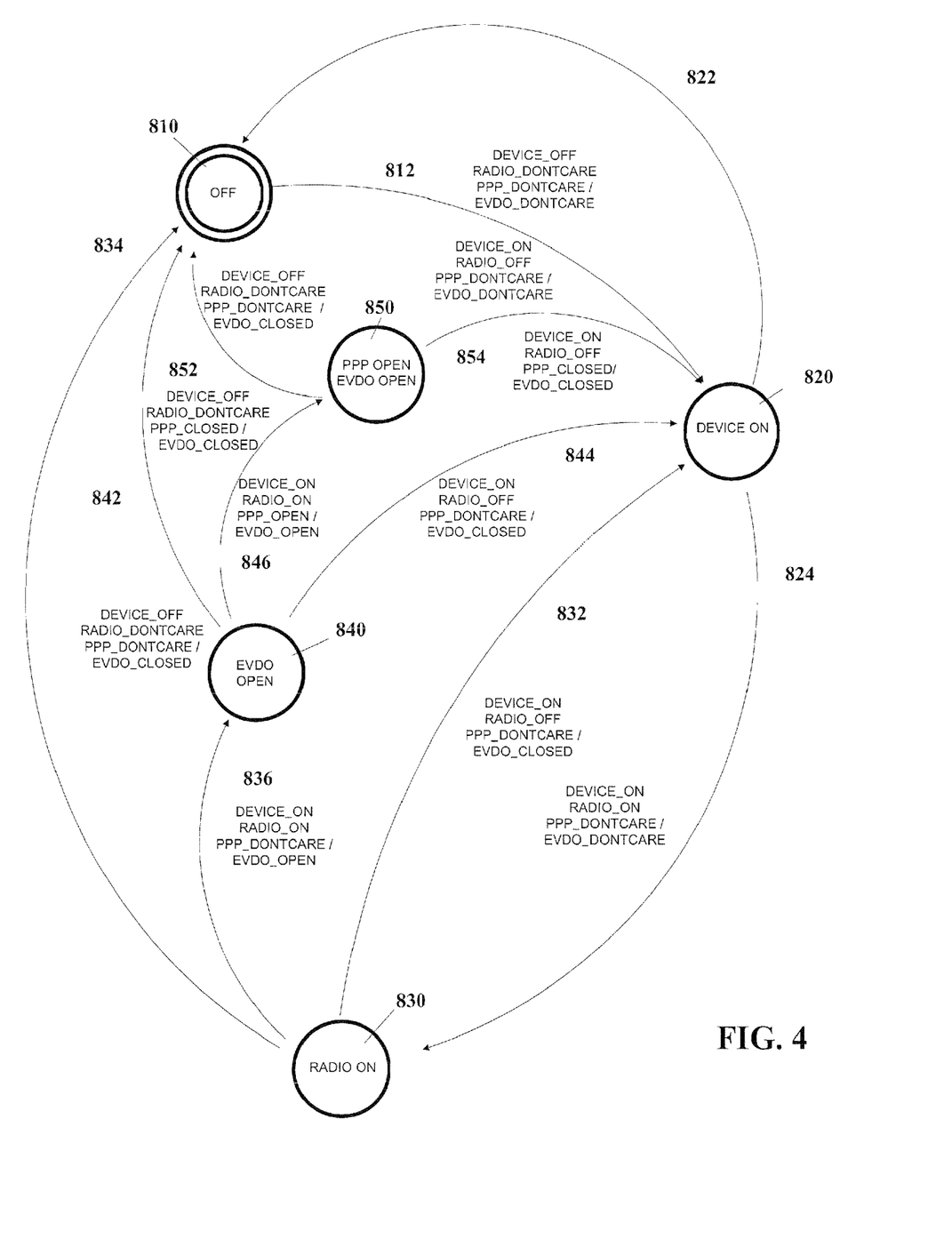
FIG. 4 is a state machine diagram for an always on hybrid access terminal.

The above can also be seen with reference to the state diagram of FIG. 4. The state diagram of FIG. 4 shows a hybrid access terminal is off in state 810. A second state 820 is when the device is on but the radio is not on.

A third state is when the device is on and the radio is on in state 830. In both states 820 and 830, there is no PPP or EVDO session.

In state 840, the EVDO session is open but the PPP session may or may not be and in state 850, the PPP session and the EVDO sessions are both open.

Starting from the state where the hybrid access terminal is off, the only option for the device is to turn the device on. This is done in step 812 and the hybrid access terminal proceeds to step 820 in which the device is on.

From state 820, the hybrid access terminal has two choices. Either the device is turned off in which case the hybrid access terminal proceeds back to state 810 or the radio is turned on in which case the hybrid access terminal proceeds to state 830. This is done in either steps 822 or 824 respectfully.

From state 830, the hybrid access terminal can turn the radio off. In which case, the hybrid access terminal proceeds back to state 820 through step 832.

Alternatively, the device can be turned off completely in which case the hybrid access terminal, in step 834, proceeds back to state 810.

Finally, if the radio has been turned on, the preferable thing for the hybrid access terminal to do is to proceed in step 836 to state 840 in which the EVDO session is opened.

Once the device is in state 840, it also has several options. A first option is if the device is turned off, in which case the hybrid access terminal proceeds through step 842 back to state 810. Further, in step 842 the EVDO session is closed. This ensures network resources are not wasted by having an unnecessary EVDO session open.

Alternatively, from state 840 the radio can be turned off but the device can remain on, in which case the hybrid access terminal proceeds back to state 820 in step 844. Again, since the radio has been turned off, the EVDO session should be closed in step 844.

From state 840, the device can proceed to state 850 in step 846 in which both the PPP and the EVDO sessions are open.

From state 850, the hybrid access terminal can proceed to state 810 if the device is turned off in which case the EVDO session is closed and the PPP session is closed in step 852.

Alternatively, from state 850, the radio can be turned off, in which case the EVDO session is closed and the PPP session is closed in state 854 and the hybrid access terminal proceeds to state 820.

Figure 5:
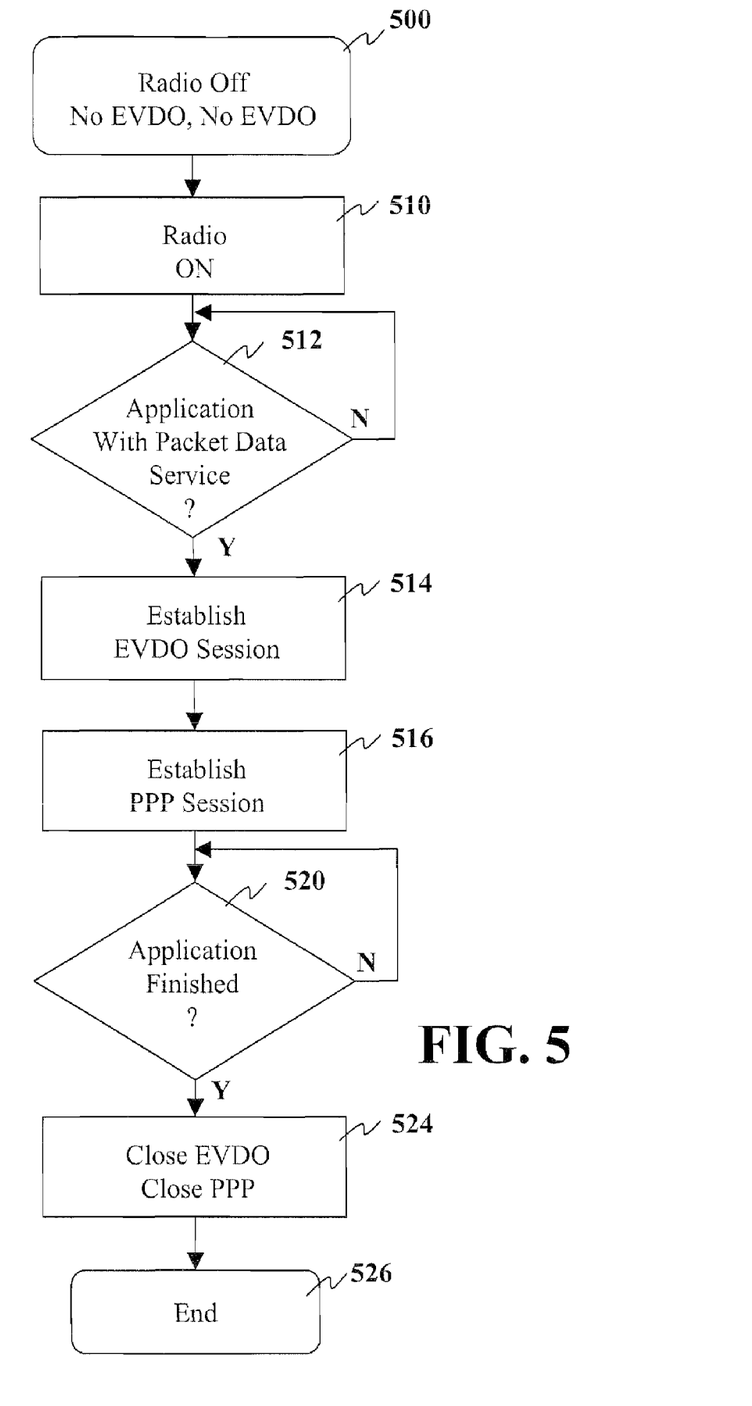
FIG. 5 is a flow chart showing the opening and closing of EVDO and PPP sessions for a non-always on hybrid access terminal.

Reference is now made to FIG. 5. FIG. 5 illustrates a non-always on device in which the radio is off and there is no PPP or EVDO sessions in state 500. When the radio is turned on in step 510, the mobile device next checks to see whether or not there is an application that uses packet data service in step 512. If in step 512 it is determined that there is no application that has packet data service then step 512 keeps leaping on itself until an application that desires packet data service is open. At this time, the hybrid access terminal proceeds to step 514 in which it opens an EVDO session and to step 516 in which it opens a PPP session.

Once the PPP session and the EVDO session are opened in steps 514 and 516 the hybrid access terminal proceeds to step 520 in which it checks whether the application is finished. If the application is finished, the hybrid access terminal proceeds to step 524 in which the PPP session and the EVDO session are ended and to step 526 in which the process is ended.

In step 520, if the application is not finished, the hybrid access terminal continues to check until the application does finish before proceeding to step 524.

The above therefore provides for an always on device selectively tying the PPP session and the EVDO sessions together to optimize network traffic and to minimize battery consumption on the hybrid access terminal. Further, on an always on device, the two can be tied together since neither is required when an application with packet data services is not operating on the non-always on device.

Figure 6:
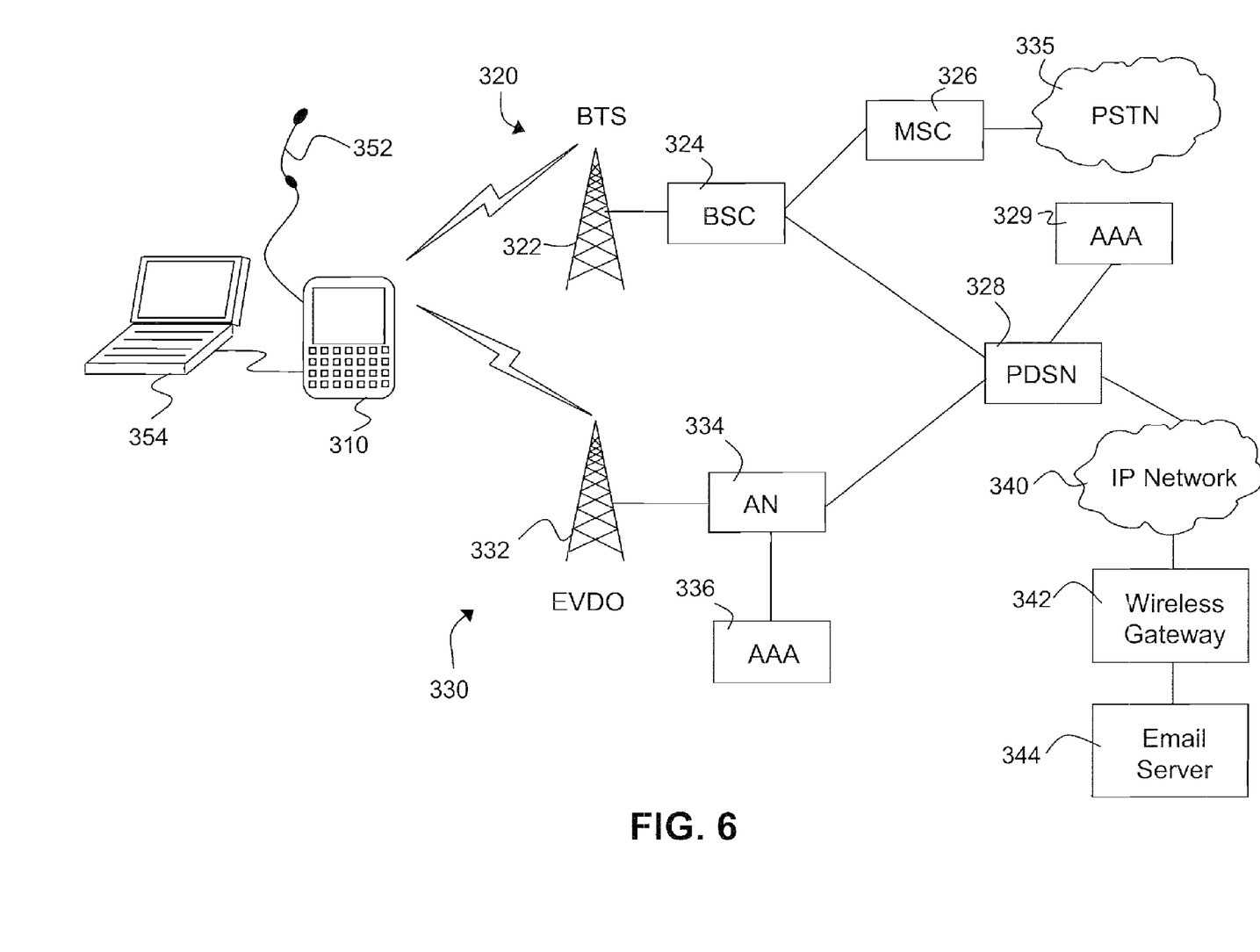
FIG. 6 is a network diagram showing an exemplary hybrid CDMA 1X/EVDO network.

Reference is now made to FIG. 6. FIG. 6 is a block diagram of an exemplary wireless data network in accordance with the present application and with which the various embodiments of the method of the instant application may cooperate. FIG. 6 shows a block diagram of a wireless data device 310 and exemplary CDMA 1x network 320, an exemplary EVDO network 330, a public switched telephone network (PSTN) 335, a data network 340, wireless gateway 342 and e-mail server 344 with which the instant techniques of this application may cooperate. The wireless data device 310 is preferably a two-way communication device having data and voice communication capabilities.

CDMA network 320 is comprised of a base transceiver station (BTS) 322 and a base station controller (BSC) 324. Base station controller 324 communicates with a mobile switching centre 326 which as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332, which communicates with access node (AN) 334. Since the EVDO network 330 is a data only network, access node 334 communicates only with PDSN 328 and not with any circuit switch components.

An authentication, authorization and accounting node 336 is associated with AN 334, and a similar node 329 is associated with PDSN 328.

Operationally, hybrid access terminal 310 communicates wirelessly with CDMA network 320 using BTS 322 and BSC 324 to gain access to the CDMA 1x network. As indicated above, the CDMA 1x network is given priority and the establishment of the CDMA network occurs prior to any EVDO network connection being established.

Hybrid access terminal 310 sends and receives both data and voice services through CDMA network 320 until an EVDO network connection with established. Base station controller 324 communicates with circuit switch services provided by MSC 326 such as voice and short message service (SMS) via PSTN 335.

Prior to an EVDO connection being established, hybrid access terminal 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the hybrid access terminal enters CDMA 1x idle state, wireless device 310 establishes a connection with EVDO network 330. This is done through EVDO sector 332 and AN 334. In this way, hybrid access terminal 310 gains access to packet data services provided by PDSN 328 using EVDO network 330. Subsequent to the establishment of an EVDO network connection with hybrid access terminal 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 352 or a user can communicate directly into the wireless device 310.

A further advantage of the present system is that due to high transfer rates associated with EVDO networks, wireless device 310 can be used as a wireless modem and be connected through various means such as a USB or other serial port, or by short range wireless communications with a computer 354. Computer 354 can then gain access to data network 340 through EVDO network 330 using hybrid access terminal 310 as the modem.

Figure 7:
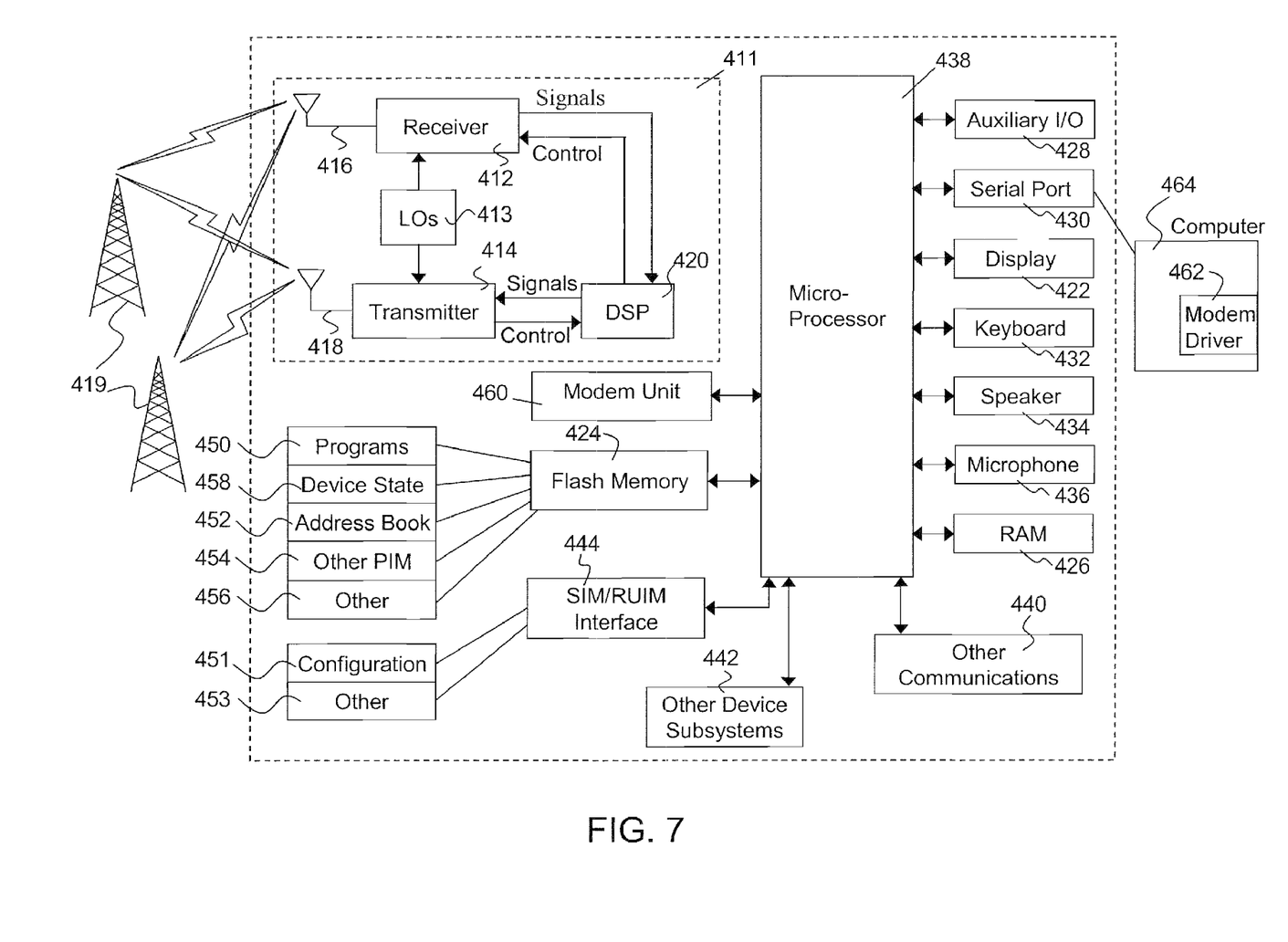
FIG. 7 is an exemplary mobile device that can be used with the present method.

Reference is now made to FIG. 7. FIG. 7 is a block diagram illustrating a hybrid access terminal apt to be used with preferred embodiments of the apparatus and method of the present application. Hybrid access terminal 400 is preferably a two-way wireless communication device having at least voice and data communication capabilities. Hybrid access terminal 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where hybrid access terminal 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, hybrid access terminal 400 may include a communication subsystem 411 designed to operate within the CDMA 1x/EVDO hybrid system.

Network access requirements will also vary depending upon the type of network 419. In some CDMA networks network access is associated with a subscriber or user of hybrid access terminal 400. A CDMA hybrid access terminal may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have approximately 64K of memory and hold many key configuration 451, and other information 453 such as identification, and subscriber related information.

When required network registration or activation procedures have been completed, hybrid access terminal 400 may send and receive communication signals over the network 419. As illustrated in FIG. 7, network 419 can consist of multiple base stations communicating with the hybrid access terminal. For example, in a CDMA 1x EVDO system, a CDMA base station and an EVDO base station communicate with the hybrid access terminal and the hybrid access terminal is connected to both simultaneously. The EVDO and CDMA 1x base stations use different paging slots to communicate with the hybrid access terminal.

Signals received by antenna 416 through communication network 419 are input to receiver 412, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Hybrid access terminal 400 preferably includes a microprocessor 438, which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, a keyboard or keypad (or multiple keyboards or keypads) 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 7 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements.

Microprocessor 438, in addition to its operating system functions, preferably enables execution of software applications on the hybrid access terminal. These functions include executing the solutions presented above. A predetermined set of applications that control basic operations, including at least data and voice communication applications for example, will normally be installed on hybrid access terminal 400 during manufacturing. A preferred software application may be a personal information manager (PIM) application having the ability to organize and manage data items relating to the user of the hybrid access terminal such as, but not limited to, e-mail, calendar events, voice mails, appointments, and task items. Naturally, one or more memory stores would be available on the hybrid access terminal to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the hybrid access terminal user's corresponding data items stored or associated with a host computer system. Further applications may also be loaded onto the hybrid access terminal 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the hybrid access terminal 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of hybrid access terminal 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of hybrid access terminal 400 is similar, except that received signals would preferably be output to a speaker 434 and signals for transmission would be generated by a microphone 436. Alternative voice or audio I/O subsystems, such as a voice message recording subsystem, may also be implemented on hybrid access terminal 400. Although voice or audio signal output is preferably accomplished primarily through the speaker 434, display 422 may also be used to provide an indication of the identity of a calling party, the duration of a voice call, or other voice call related information for example.

Serial port 430 in FIG. 7, would normally be implemented in a personal digital assistant (PDA)-type hybrid access terminal for which synchronization with a user's desktop computer (not shown) may be desirable, but is an optional device component. Such a port 430 would enable a user to set preferences through an external device or software application and would extend the capabilities of hybrid access terminal 400 by providing for information or software downloads to hybrid access terminal 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the hybrid access terminal to a computer to act as a modem. A modem unit 460 interacts with a driver 462 in a computer 464 to allow data transfer through the hybrid access terminal. With EVDO networks, a high rate of data transfer can be achieved using the hybrid access terminal 400 as the modem. Depending on the interface provided by driver 462, unit 460 could be an IP routing module. Further, driver 462 could provide either a modem interface or alternatively an IP interface to computer 464. As will be appreciated by those skilled in the art, the combination of driver 462 and unit 460 must provide a communication interface for computer 430 to be enabled for communications originated and/or terminated at computer 430.

Other communications subsystems 440, such as a short-range communications subsystem, is a further optional component which may provide for communication between hybrid access terminal 400 and different systems or devices, which need not necessarily be similar devices. For example, the subsystem 440 may include an infrared device and associated circuits and components or a Bluetooth™ communication module to provide for communication with similarly enabled systems and devices.

Advantageously, communications originating and/or terminating at computer 464 benefit from the techniques of this application as module 460 preferably uses the techniques taught herein in a manner that is transparent to computer 464.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for operating a hybrid access terminal that is operable to communicate in an EVDO, Evolution Data Only, communication session and to communicate in a PPP, Point to Point Protocol, communication session, said method comprising:
   selectably opening the EVDO communication session when the hybrid access terminal is powered and capable of communicating;
   selectably opening the PPP communication session when the hybrid access terminal is powered and capable of communicating;
   selectably closing the EVDO communication session, selection made irrespective of whether the PPP communication session is open; and
   selectably closing the PPP communication session, selection made irrespective of whether the EVDO communication session is open.

2. The method of claim 1 wherein said selectably opening the EVDO communication session comprises opening the EVDO communication session, wherein said selectably opening the EVDO communication session comprises opening the PPP communication session, and wherein said selectably closing the EVDO communication session comprises closing the EVDO communication session.

3. The method of claim 1 wherein said selectably opening the EVDO communication session comprises opening the EVDO communication session, wherein said selectably opening the EVDO communication session comprises opening the PPP communication session, and wherein said selectably closing the PPP communication session comprises closing the PPP communication session.

4. The method of claim 1 wherein said selectably opening the EVDO communication session comprises opening the EVDO communication session, and wherein said selectably closing the EVDO communication session comprises closing the EVDO communication session.

5. The method of claim 1 wherein said selectably opening the PPP communication session comprises opening the PPP communication session and wherein said selectably closing the PPP communication session comprises closing the PPP communication session.

6. The method of claim 1 further comprising, prior to said selectably opening the EVDO communication session, powering the hybrid access terminal.

7. The method of claim 1 wherein said selectably opening the EVDO communication session comprises opening the EVDO communication session, wherein said selectably opening the EVDO communication session comprises opening the PPP communication session, and wherein said selectably closing the EVDO communication session comprises closing the EVDO communication session at a network boundary.

8. The method of claim 7 wherein said selectably closing the PPP communication session comprises leaving the PPP session open at the network boundary.

9. The method of claim 1 wherein said selectably closing the EVDO session comprises leaving the EVDO communication session open if the PPP communication session is brought down.

10. The method of claim 1 wherein, subsequent to said selectably opening the eVDO communication session and subsequent to opening the PPP communication session, the hybrid access terminal is turned off, and wherein said selectably closing the EVDO communication session comprises closing the EVDO communication session when the hybrid access terminal is turned off.

11. The method of claim 10 wherein said selectably closing the PPP communication session comprises closing the PPP communication session when the hybrid access terminal is turned off.

12. An apparatus for operating a hybrid access terminal that is operable to communicate in an EVDO communication session and to communicate in a PPP communication session, said apparatus comprising:
   a first session opener configured selectably to open the EVDO communication session when the hybrid access terminal is powered and capable of communicating;
   a second session opener configured selectably to open the PPP communication session when the hybrid access terminal is powered and capable of communicating;
   a first session closer configured selectably to close the EVDO communication session, selection made irrespective of whether the PPP communication session is open; and
   a second session closer configured selectably to close the PPP communication session, selection made irrespective of whether the EVDO communication session is open.

13. The apparatus of claim 12 wherein said first session opener is configured to open the EVDO communication session, wherein said second session opener is configured to open the PPP communication session, and wherein said first session closer is configured to close the EVDO communication session.

14. The apparatus of claim 12 wherein said first session opener is configured to open the EVDO communication session, wherein said second session opener is configured to open the PPP communication session, and wherein said second session closer is configured to close the PPP communication session.

15. The apparatus of claim 12 wherein said first session opener is configured to open the EVDO communication session, and wherein said first session closer is configured to close the EVDO communication session.

16. The apparatus of claim 12 wherein said second session opener is configured to open to the PPP communication session and wherein said second session closer is configured to close the PPP communication session.

17. The apparatus of claim 12 wherein said first session opener is configured to open the EVDO communication session, wherein said second session opener is configured to open the PPP communication session, and wherein said first session closer is configured to close the EVDO communication session at a network boundary.

18. The apparatus of claim 17 wherein said second session closer is configured to leave the PPP session open at the network boundary.

19. The apparatus of claim 12 wherein said first session closer is configured to leave the EVDO, Evolution Data Only, communication session open if the PPP, Point to Point Protocol, communication session is brought down.

20. A method for operating a hybrid access terminal that is operable to communicate in an EVDO communication session and to communicate in a PPP communication session, said method comprising:
 opening the EVDO communication session when an application that uses packet data services;
 if the PPP session is not already opened, opening the PPP session; and
 requiring closing of both the PPP session and the EVDO session only if the hybrid access terminal is turned off.

* * * * *